June 12, 1951  E. C. ADKINS  2,556,314
INTERNAL GAUGING DEVICE
Filed Oct. 25, 1946

INVENTOR
Earl C Adkins
BY
Edward T. Noe Jr
ATTORNEY

Patented June 12, 1951

2,556,314

UNITED STATES PATENT OFFICE 2,556,314

INTERNAL GAUGING DEVICE

Earl C. Adkins, Dayton, Ohio, assignor to The Sheffield Corporation, Dayton, Ohio, a corporation of Ohio Application October 25, 1946, Serial No. 705,594

1 Claim. (Cl. 33—178)

This invention relates to gauges and the like built of a cemented carbide portion and another structural portion having a different coefficient of expansion from that of the cemented carbide.

One object of the invention is the provision of a gauge having a ring portion of cemented carbide and a supporting spider structure integrally connected to the ring and of a material having a different coefficient of expansion from that of the cemented carbide, the spider having arms with portions extending generally transversely of radial planes and adapted for radial flexure.

Another object resides in the method of making a gauge having a cemented carbide ring portion and a spider portion of steel or the like, in which the ring and the spider are placed together with a tight fit and the arms of the spider are then brazed or bonded to the ring in a manner that prevents imposition of breaking strains on the cemented carbide ring.

Other objects and advantages of the invention will be apparent from the following description, the appended claim, and the accompanying drawing, in which:

Figure 2:
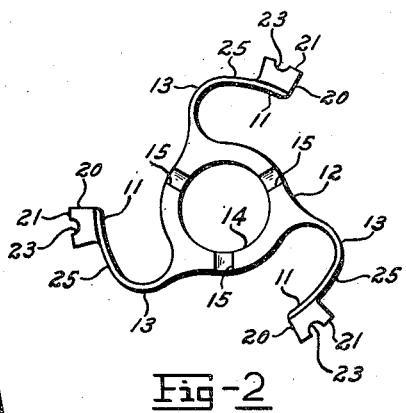
Fig. 2 is a detail view of the spider.
Figure 1:
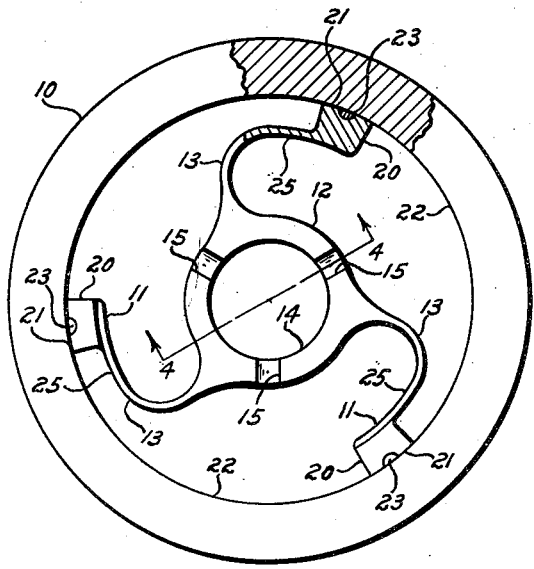
Fig. 1 is a side elevation of a plug gauge embodying the present invention, a portion of the gauge being shown in section to disclose the connection between the cemented carbide ring and one of the spider arms.
Figure 3:
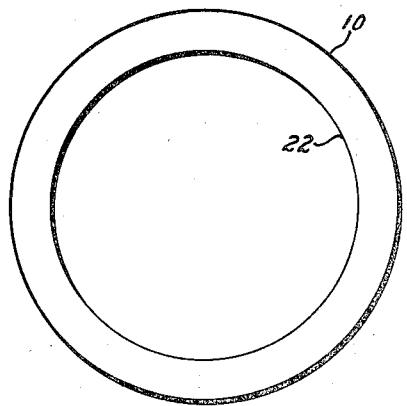
Fig. 3 is a detail view showing the cemented carbide ring.

Referring more particularly to the drawing, in which the same reference numerals have been used to designate like parts in the different views, one embodiment of the invention is shown as a plug gauge of circular form, and having a gauging peripheral surface which may be either plain or threaded. Such gauges are either thrust into a hole as in the case of a cylindrical gauge, to determine whether or not the hole is of proper size, or the gauge is screwed into a threaded opening, as in the case of a thread plug gauge. The repeated application of such gauges to the workpieces results in wear on the gauging surface so that after a period of use, a few thousandths or even a few ten-thousandths inches of wear might make the gauge useless.

In order to lengthen the period of useful life some plug gauges have been made of cemented carbide because of its resistance to wear, but cemented carbide bodies are expensive and in the case of gauges of larger size the expense factor is of considerable importance. Attempts to provide a composite structure of a cemented carbide ring and a supporting body of steel or the like have not proved satisfactory because of breaking strains imposed on the comparatively brittle cemented carbide ring that results from the heating and contraction of the parts in bonding them together as by brazing or the like. These strains are imposed because the coefficient of expansion of iron or steel is considerably greater than the co-efficient of the cemented carbide.

Figure 4:
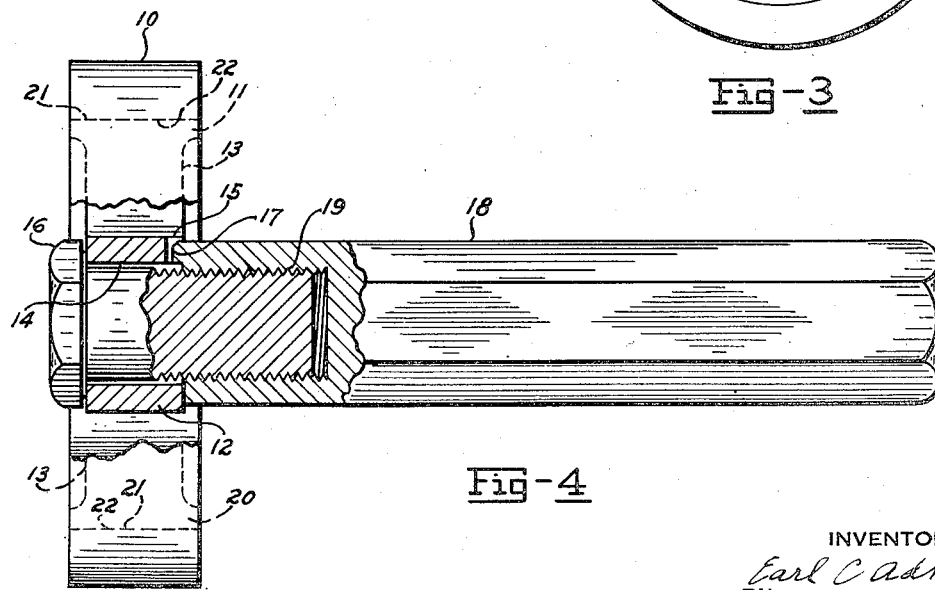
Fig. 4 is a view of the assembled gauge and handle, including a partly sectional view on the line 4—4 of Fig. 1, looking in the direction of the arrows.

In accordance with the present invention, the gauge comprises a ring 10 of cemented carbide, the radial depth of the ring being only a small fraction of the total diameter. Within the ring is a steel spider 11 having a hub portion 12 and a series of outwardly extending arms 13. The hub portion 12 has a hole 14 and radial locating grooves 15 which respectively receive a threaded stud 16 and tongues or projections 17 of the handle 18. The handle is internally threaded to receive the threads 19 of the stud as will be apparent from Fig. 4. Other forms of handles may be used.

The outer ends of the arms 13 terminate in lugs 20 having cylindrical outer surfaces 21 of substantially the same diametrical dimension as the inner cylindrical surface 22 of the ring, so they will enter the ring with a force fit. These lug portions preferably have grooves 23 extending parallel to the axis of the gauge so that a pocket is formed into which brazing material can be supplied.

The outer ends of the arms are integrally bonded, preferably by brazing, to the inner surface of the ring. In this brazing operation the parts are heated and the brazing material supplied in the grooves 23 flows outwardly between the mating surface of the arms and the ring so that when the structure cools a firm, permanent integral connection is made.

Each arm 13 extends from hub 12 to lug 20 in a generally C-shaped curve, the arcuate portion 25 nearest the lug being approximately concentric with the ring and axially about as wide as the ring. This portion 25 of the arm which is concentric with the ring is comparatively thin, so as to permit some flexure or radially yielding action. Thus during the heating process which is incidental to the brazing operation the portion 25 of the arm can flex to a sufficient extent to prevent the imposition of breaking strains on the cemented carbide ring. The inside of the ring and the outside of the spider are of substantially the same diameter at normal room temperatures before the brazing operation takes place, so that the ring and the spider will be held and definitely located one on the other because of the force fit connection between these parts. This tight fit is essential to obtaining a strong brazed joint. When the parts are heated, during brazing, the steel spider tends to expand to a greater extent than the cemented carbide ring, but the flexing of the arms, as described, prevents fracture or unduly straining the cemented carbide ring. When the parts are cooled after the brazing operation, the ring and the spider are free of strains since they both contract to their original form.

Due to the fact that the outward pressure exerted by the arms of the spider during brazing is minimized by the flexing action of the arms of the spider, the cemented carbide ring may be accurately ground or even finished to exact size before permanently connecting the ring to the spider, and, if desired, after forcing the spider into the ring so that the spider itself can act as a support for holding the ring while its outer surface is being finished to size.

While the form of apparatus and the method of manufacture herein described constitute preferred embodiment of the invention, it is to be understood that the invention is not limited to this precise form of apparatus or method, and that changes may be made therein without departing from the scope of the invention which is defined in the appended claim.

What is claimed is:

A gauge comprising a cemented carbide gauging ring having an outer finished gauging surface, and a ring support including a steel spider having a hub portion and a plurality of curved arms of substantially "C" shape extending outwardly from the hub portion to the inner wall of the ring, the outer ends of said arms having the same radius of curvature as the inner surface of the cemented carbide ring, an integral bond between the outer end of each of said arms and the inner surface of said ring, each of said arms having a portion of substantial length in a direction axial of the gauge and extending approximately concentric with the ring, said portion being sufficiently thin in a radial direction as to flex radially.

EARL C. ADKINS.

REFERENCES CITED

The following references are of record in the file of this patent:

UNITED STATES PATENTS

| Number | Name | Date |
| --- | --- | --- |
| 1,462,865 | Lieckfelt | July 24, 1923 |
| 2,360,058 | Hohwart | Oct. 10, 1944 |